(12) United States Patent
Shimada

(10) Patent No.: US 10,725,496 B2
(45) Date of Patent: Jul. 28, 2020

(54) DATA PROCESSING APPARATUS, METHOD FOR CONTROLLING DATA PROCESSING APPARATUS, AND RECORDING MEDIUM

(71) Applicant: Olympus Corporation, Hachioji-shi, Tokyo (JP)

(72) Inventor: Yoshinao Shimada, Hino (JP)

(73) Assignee: Olympus Corporation, Tokyo (JP)

( * ) Notice: Subject to any disclaimer, the term of this patent is extended or adjusted under 35 U.S.C. 154(b) by 228 days.

(21) Appl. No.: 15/969,711

(22) Filed: May 2, 2018

(65) Prior Publication Data

US 2018/0329449 A1 Nov. 15, 2018

(30) Foreign Application Priority Data

May 15, 2017 (JP) ................. 2017-096299

(51) Int. Cl.
*G06F 1/32* (2019.01)
*G06F 1/10* (2006.01)
*G06F 1/3234* (2019.01)
*G06F 1/08* (2006.01)
*G06F 1/3287* (2019.01)
*H04L 7/033* (2006.01)
*G06F 13/40* (2006.01)
*G06F 13/42* (2006.01)

(52) U.S. Cl.
CPC ............ *G06F 1/10* (2013.01); *G06F 1/08* (2013.01); *G06F 1/3234* (2013.01); *G06F 1/3278* (2013.01); *G06F 1/3287* (2013.01); *G06F 13/4072* (2013.01); *G06F 13/4295* (2013.01); *H04L 7/033* (2013.01)

(58) Field of Classification Search
None
See application file for complete search history.

(56) References Cited

U.S. PATENT DOCUMENTS

| | | | | |
|---|---|---|---|---|
| 8,937,727 B2* | 1/2015 | Silverbrook | ............ | B41J 2/14 358/1.1 |
| 2009/0287873 A1* | 11/2009 | Baba | ............ | H04N 5/232 711/103 |
| 2014/0153021 A1* | 6/2014 | Matsumoto | ............ | H04N 1/17 358/1.13 |
| 2015/0012774 A1* | 1/2015 | Maeda | ............ | G06F 11/0793 714/5.1 |

(Continued)

FOREIGN PATENT DOCUMENTS

JP 2012-120158 6/2012

*Primary Examiner* — Danny Chan
(74) *Attorney, Agent, or Firm* — John C. Pokotylo; Pokotylo Patent Services

(57) ABSTRACT

A data processing apparatus includes a data output section configured to output serial data associated with video information through one or more lanes and a data processing section configured to process the serial data by supplying power from a power supply section to a receiving section configured to receive the serial data. The data processing section turns off the power supply to the receiving section while maintaining an output state of the data output section for a known ineffective period, turns on the power supply to the receiving section prior to the start of an effective period, then detects starting information based on a predetermined code included in the serial data and establishes a receiving operation of the receiving section.

17 Claims, 5 Drawing Sheets

(56) References Cited

U.S. PATENT DOCUMENTS

| | | | |
|---|---|---|---|
| 2016/0048198 A1* | 2/2016 | Bhadraiah | G06K 9/78 |
| | | | 713/323 |
| 2016/0150469 A1* | 5/2016 | Hsu | H04L 69/22 |
| | | | 370/311 |
| 2018/0013955 A1* | 1/2018 | Kim | G06K 9/00335 |
| 2018/0048802 A1* | 2/2018 | Kallstrom | H04N 5/23245 |
| 2018/0287820 A1* | 10/2018 | Mayer-Wolf | H04L 49/3063 |

* cited by examiner

DATA PROCESSING APPARATUS, METHOD FOR CONTROLLING DATA PROCESSING APPARATUS, AND RECORDING MEDIUM

CROSS REFERENCE TO RELATED APPLICATION

This application claims benefit of Japanese Application No. 2017-096299 filed in Japan on May 15, 2017, the entire contents of which are incorporated herein by this reference.

BACKGROUND OF THE INVENTION

1. Field of the Invention

The present invention relates to a data processing apparatus configured to output and receive serial data which is video information converted to data based on a predetermined format, a method for controlling the data processing apparatus and a recording medium.

2. Description of the Related Art

In recent years, image pickup devices have been implemented with increasingly many pixels and designed to operate increasingly faster, and as a result, a volume of image data per unit time period communicated from an image pickup device to an image processing section has been drastically increasing. Following such a trend, electrical I/Fs (interfaces) between an image pickup device and an image processing section have been on a path of acceleration.

To be more specific, the electrical I/Fs (interfaces) between the image pickup device and the image processing section are technologically evolving from simple parallel I/Fs to Sub LVDS, which are differential serial I/Fs, and furthermore a clock (CLK) is embedded in communication data, and the electrical I/Fs have been technologically evolved into SLVS-EC with still higher communication bit rates.

As one example of such technologies, Japanese Patent Application Laid-Open Publication No. 2012-120158 describes a technique of SLVS-EC under an 8b10b scheme in which an 8-bit signal is converted to a 10-bit signal and the clock is embedded in communication data.

With the advancement of technologies, energy consumption for communication per unit data amount is decreasing. However, since an increase in the data amount tends to surpass the decrease in energy consumption, power consumption required to acquire one image tends to increase in the long run. To be more specific, examples of factors of increasing power consumption include a PLL (phase locked loop) that generates a high-speed clock, a timing adjusting circuit, a differential amplifier and a CDR (clock data recovery).

In the case of a battery-driven digital camera or the like, when power consumption is large, not only does the number of images that can be taken decrease but also the effect of heat generated from power consumption on the digital camera cannot be ignored.

Therefore, a mechanism of a communication protocol stop sequence is proposed which interrupts communication when no effective data is included in communication data, stops operation of a communication-related circuit on both the image pickup device (data output section) side and the image processing section (data receiving section) side and can thereby reduce power consumption. However, to achieve such power saving, it is necessary to adapt both the data output section and the data receiving section to such a mechanism.

While among various types of image pickup devices, some image pickup devices are configured to reduce communication power in correspondence to the above-described mechanism even during high-speed operation (e.g., when reading a high definition movie at 60 fps), some image pickup devices do not support the above-described mechanism during high-speed operation.

The image pickup devices that do not support the above-described mechanism during high-speed operation are more advantageous in cost than the image pickup devices supporting the mechanism, and so such image pickup devices still seem to be demanded.

SUMMARY OF THE INVENTION

A data processing apparatus according to one aspect of the present invention includes a data output section configured to repeatedly output serial data which is video information converted to data based on a predetermined format through one or more lanes, and a data processing section including a receiving section configured to receive the serial data outputted from the data output section and a power supply section configured to supply power to the receiving section, and configured to process the serial data received by the receiving section, in which the data processing section stops receiving operation of the receiving section by turning off power supply to the receiving section from the power supply section for a period during which the serial data outputted from the data output section is ineffective while maintaining a state in which the data output section outputs the serial data, turns on the power supply to the receiving section from the power supply section prior to the start of a period during which the serial data outputted from the data output section is effective, detects, after turning on the power supply to the receiving section, starting information necessary to start the receiving operation of the receiving section based on a predetermined code included in the serial data outputted from the data output section, and establishes and starts the receiving operation of the receiving section based on the detected starting information.

A method for controlling a data processing apparatus according to another aspect of the present invention is a method for controlling a data processing apparatus provided with a data output section and a data processing section provided with a receiving section and a power supply section, the method for controlling a data processing apparatus including a data outputting step of causing the data output section to repeatedly output serial data which is video information converted to data based on a predetermined format through one or more lanes, a receiving step of causing the receiving section to receive the serial data outputted from the data output section, a power supplying step of causing the power supply section to supply power to the receiving section and a data processing step of causing the data processing section to process the serial data received by the receiving section, in which the data processing step includes a first step of stopping receiving operation of the receiving section by turning off power supply to the receiving section from the power supply section for a period during which the serial data outputted from the data output section is ineffective while maintaining a state in which the data output section outputs the serial data, and a second step of turning on the power supply to the receiving section from the power supply section prior to the start of a period during which the serial data outputted from the data output section is effective, detecting, after turning on the power supply to the receiving section, starting information necessary to start the receiving operation of the receiving section based on a predetermined code included in the serial data outputted from the data output section, and establishing and starting the receiving operation of the receiving section based on the detected starting information.

A recording medium according to a further other aspect of the present invention is a computer-readable, non-transitory recording medium configured to record a program for causing a computer to perform control of a data processing apparatus including a data output section and a data processing section provided with a receiving section and a power supply section, the program including a data outputting step of causing the data output section to repeatedly output serial data which is video information converted to data based on a predetermined format through one or more lanes, a receiving step of causing the receiving section to receive the serial data outputted from the data output section, a power supplying step of causing the power supply section to supply power to the receiving section and a data processing step of causing the data processing section to process the serial data received by the receiving section, in which the data processing step includes a first step of stopping receiving operation of the receiving section by turning off power supply to the receiving section from the power supply section for a period during which the serial data outputted from the data output section is ineffective while maintaining a state in which the data output section outputs the serial data, and a second step of turning on the power supply to the receiving section from the power supply section prior to the start of a period during which the serial data outputted from the data output section is effective, detecting, after turning on the power supply to the receiving section, starting information necessary to start the receiving operation of the receiving section based on a predetermined code included in the serial data outputted from the data output section, and establishing and starting the receiving operation of the receiving section based on the detected starting information.

DETAILED DESCRIPTION OF THE PREFERRED EMBODIMENT

Hereinafter, an embodiment of the present invention will be described with reference to the accompanying drawings.

Embodiment 1

Figure 1:
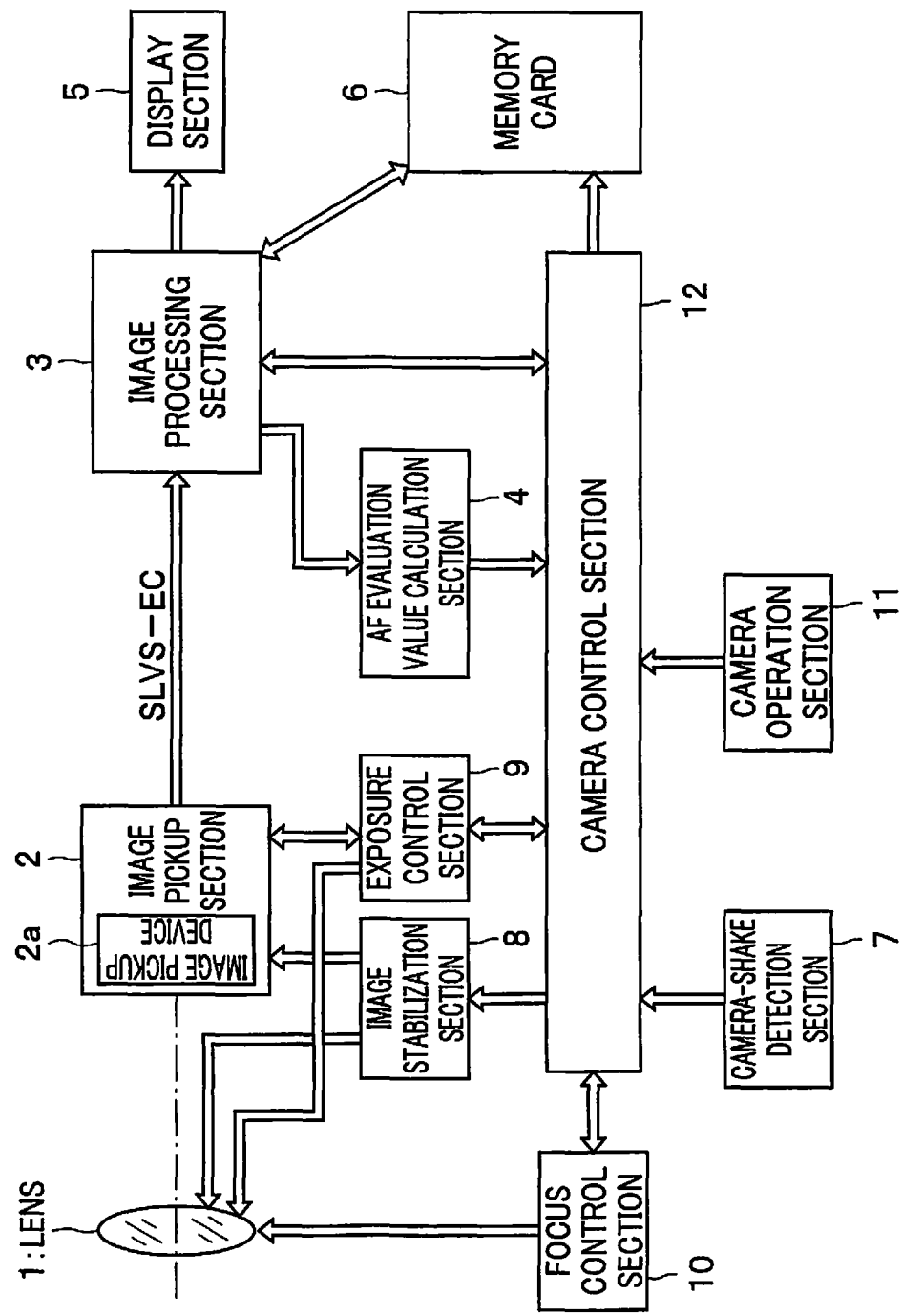
FIG. 1 is a block diagram illustrating a configuration of an image pickup apparatus to which a data processing apparatus according to Embodiment 1 of the present invention is applied.

FIG. 1 to FIG. 7 illustrate Embodiment 1 of the present invention, and FIG. 1 is a block diagram illustrating a configuration of an image pickup apparatus to which a data processing apparatus is applied.

Note that although FIG. 1 illustrates an example in which the image pickup apparatus is configured, for example, as a digital camera, the image pickup apparatus is not limited to a digital camera, but may be any one of various types of apparatuses with a photographing function such as a digital video camera, a telephone apparatus with a photographing function, an electronic endoscope, a microscope with a photographing function, a telescope with a photographing function.

As shown in FIG. 1, the image pickup apparatus is provided with a lens 1, an image pickup section 2 including an image pickup device 2a, an image processing section 3, an AF (autofocus) evaluation value calculation section 4, a display section 5, a camera-shake detection section 7, an image stabilization section 8, an exposure control section 9, a focus control section 10, a camera operation section 11 and a camera control section 12. Note that FIG. 1 also describes a memory card 6, but since the memory card 6 is configured to be attachable or detachable to/from the image pickup apparatus, the memory card 6 need not have a configuration specific to the image pickup apparatus.

The lens 1 is an image pickup optical system configured to form an optical image of an object on an image pickup device 2a. The lens 1 is provided with a focus lens for adjusting a focal position (focusing position) to achieve focusing and an aperture configured to control a range of passing luminous flux, and is further provided with an image stabilization function in the present embodiment.

The image pickup section 2 is configured to photoelectrically convert an optical image of the object formed by the lens 1 through the image pickup device 2a, generate video information and output the video information as an image signal. The image pickup section 2 according to the present embodiment is configured to make the image pickup device 2a movable within a plane perpendicular to a photographing optical axis of the lens 1 and is provided with an image stabilization function.

The image pickup section 2 is configured as a digital image pickup section provided with an A/D converter, provided with, for example, a column parallel-type A/D converter to achieve the speed enhancement, and enabled to simultaneously convert pixel data corresponding to one line to a digital signal.

Here, the image pickup section 2 of the present embodiment is assumed to be of a type without a function of turning off power supply to a data output section 2b during a high-speed operation (e.g., when reading a high definition movie at 60 fps). However, on/off of power supply to main parts in the image pickup section 2 such as the column parallel-type A/D converter can be controlled by a command from the camera control section 12 via the exposure control section 9 even during the high-speed operation. Therefore, when effective data is not outputted, the image pickup section 2 is enabled to reduce power consumption by a certain degree by turning off operations of the main parts in the image pickup section 2 such as the column parallel-type A/D converter. Furthermore, the image pickup section 2 may output an effective communication period command signal indicating a period for outputting effective communication data (effective communication period) to the exposure control section 9. Note that start timing of the effective communication period indicated by the effective communication period command signal precedes the start timing of the effective communication period in actual communication data by a predetermined period of time as is clear from FIG. 7. For the predetermined period of time, a period of time equal to or longer than a period of time necessary to start receiving operation of a receiving section 3b is secured.

The image processing section 3 is configured to receive an image signal outputted from the image pickup section 2, perform various types of image processing on the inputted image signal to generate an image signal for display or recording.

The AF evaluation value calculation section 4 is configured to receive the image signal outputted from the image pickup section 2 via the image processing section 3, calculate an AF evaluation value indicating a focusing state and output the AF evaluation value to the camera control section 12.

The display section 5 is configured to display an image based on a signal subjected to image processing for display by the image processing section 3. The display section 5 is configured to display a live view, display a still image immediately after photographing, reproduce/display a recorded still image, display a movie being recorded, reproduce/display a movie or the like, and also display various kinds of information associated with the image pickup apparatus.

The memory card 6 is a recording medium configured to save signals (still image signal, movie signal or the like) subject to image processing for recording by the image processing section 3.

The camera-shake detection section 7 is constructed of an acceleration sensor and an angular velocity sensor or the like and is configured to detect camera-shake of the image pickup apparatus and output the detected camera-shake to the camera control section 12.

The image stabilization section 8 is configured to move at least one of the lens 1 and the image pickup device 2a so as to cancel out the detected camera-shake based on the control of the camera control section 12 and reduce influences of camera-shake on the optical image of the object formed on the image pickup device 2a.

The exposure control section 9 is configured to control a device shutter (an optical shutter when the image pickup apparatus is provided with the optical shutter) and cause the image pickup section 2 to acquire an image under the control of the camera control section 12 based on the shutter speed (exposure time) determined by the camera control section 12. Furthermore, the exposure control section 9 is configured to also control the aperture included in the lens 1 based on an aperture value determined by the camera control section 12.

Here, the shutter speed and the aperture value are determined by the camera control section 12 based on a program diagram or the like according to, for example, an APEX system using photometric data calculated based on an image signal outputted from the image pickup section 2 and ISO sensitivity set by the camera operation section 11 (or automatically set by the camera control section 12). Furthermore, the exposure control section 9 is configured to output drive information of the image pickup section 2 to the camera control section 12. Furthermore, the exposure control section 9 may also output information on an effective communication period based on the effective communication period command signal inputted from the image pickup section 2 to the camera control section 12.

The focus control section 10 is configured to drive the lens 1 to adjust a focal position (focusing position). That is, the focus control section 10 is configured to drive the focus lens included in the lens 1 based on the control of the camera control section 12 that receives an AF evaluation value from the AF evaluation value calculation section 4 so as to achieve focusing of the object image formed on the image pickup device 2a. The focus control section 10 is also configured to output lens drive information such as the lens position to the camera control section 12.

The camera operation section 11 is an operation section configured to perform various input operations on the image pickup apparatus. The camera operation section 11 includes operation members such as a power switch to turn on/off the power of the image pickup apparatus, a release button to instruct/input still image photographing or movie photographing, mode buttons to set a still image photographing mode, a movie photographing mode, a live view mode, a still image/movie reproducing mode or the like.

The camera control section 12 is configured to control the entire image pickup apparatus including the image processing section 3, the memory card 6, the image stabilization section 8, the exposure control section 9, the focus control section 10 or the like based on the lens drive information from the focus control section 10, the AF evaluation value from the AF evaluation value calculation section 4, the drive information of the image pickup section 2 from the exposure control section 9, processing information from the image processing section 3, camera-shake information from the camera-shake detection section 7, operation input from the camera operation section 11 or the like. The camera control section 12 may also output information on the effective communication period inputted from the exposure control section 9 to the image processing section 3. Note that as described above, the information on the effective communication period outputted from the image pickup section 2 is transmitted to the image processing section 3 via the exposure control section 9 and the camera control section 12, but without being limited to the configuration, the effective communication period command signal including the information on the effective communication period may be directly transmitted from the image pickup section 2 to the image processing section 3.

Figure 2:
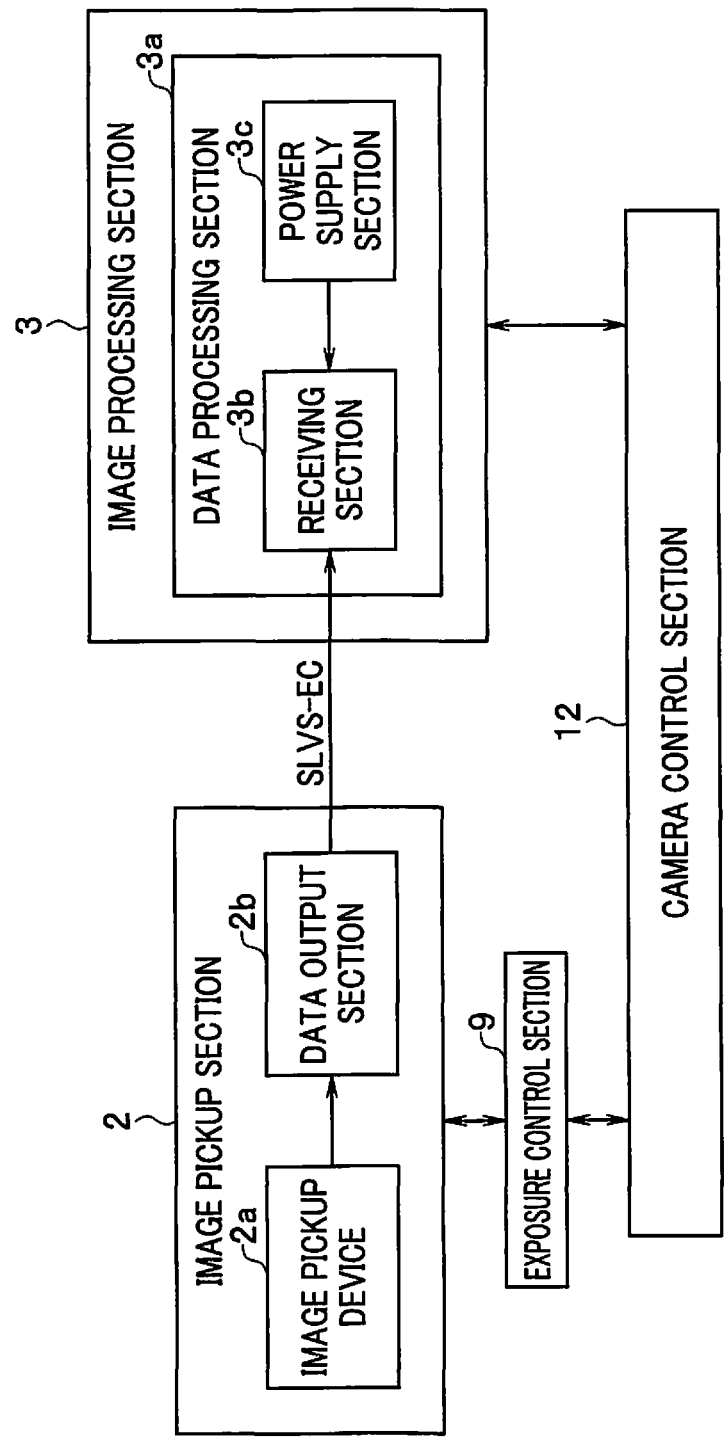
FIG. 2 is a block diagram illustrating more detailed configurations of an image pickup section and an image processing section according to the Embodiment 1.

Next, FIG. 2 is a block diagram illustrating more detailed configurations of the image pickup section 2 and the image processing section 3.

The image pickup section 2 is further provided with the data output section 2b in addition to the aforementioned image pickup device 2a and configured to output an image signal (video information) generated by the image pickup device 2a via the data output section 2b.

Figure 3:
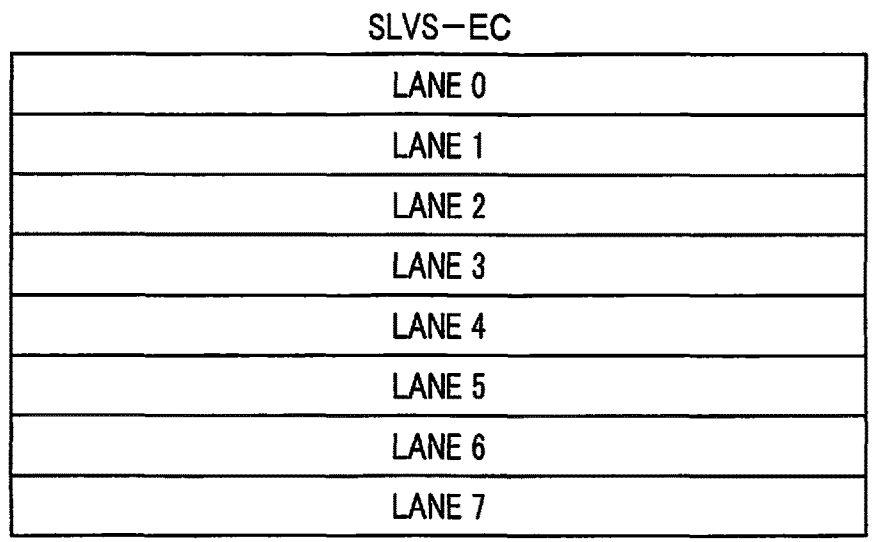
FIG. 3 is a diagram illustrating an example of a lane configuration of SLVS-EC according to the Embodiment 1.

The data output section 2b is configured to repeatedly output serial data which is video information generated by the image pickup device 2a and converted to data based on a predetermined format through one or more lanes constituting communication paths (for example, a plurality of lanes as shown in following FIG. 3).

As the predetermined format here, SLVS-EC which is an embedded clock (EC) type scalable low voltage signaling is adopted in the present embodiment. The SLVS-EC includes an 8b10b scheme as a scheme of embedding clock timing information in data (scheme associated with an EC part in the SLVS-EC). The 8b10b scheme is a scheme in which variation edges of 10 and 01 minimum necessary for clock reproduction are embedded when 8-bit data is encoded to 10-bit data to thereby enable the clock to be reproduced from the encoded data.

Here, FIG. 3 is a diagram illustrating an example of a lane configuration in the SLVS-EC.

In the example shown in FIG. 3, eight lanes from lane 0 to lane 7 are used for communication between the image pickup section 2 which is the transmitting side and the image processing section 3 which is the receiving side.

Furthermore, the image processing section 3 is provided with a data processing section 3*a* including the receiving section 3*b* and a power supply section 3*c*.

The receiving section 3*b* is configured to receive serial data outputted from the data output section 2*b*.

The power supply section 3*c* is configured to supply power to the receiving section 3*b*. The data processing section 3*a* which receives a command from the camera control section 12 can control, for example, on/off of the power supply from the power supply section 3*c* to the receiving section 3*b*.

The data processing section 3*a* is configured to process the serial data received by the receiving section 3*b*.

For a period during which the serial data outputted from the data output section 2*b* is ineffective, the data processing section 3*a* stops the receiving operation of the receiving section 3*b* by turning off the power supply to the receiving section 3*b* from the power supply section 3*c* while maintaining a state in which the data output section 2*b* outputs the serial data.

Furthermore, prior to the start of the period during which the serial data outputted from the data output section 2*b* is effective, the data processing section 3*a* is configured to turn on the power supply to the receiving section 3*b* from the power supply section 3*c*, after the turning on of the power supply to the receiving section 3*b*, then detect starting information necessary to start the receiving operation of the receiving section 3*b* based on a predetermined code included in the serial data outputted from the data output section 2*b*, establish and start the receiving operation of the receiving section 3*b* based on the detected starting information.

Figure 4:
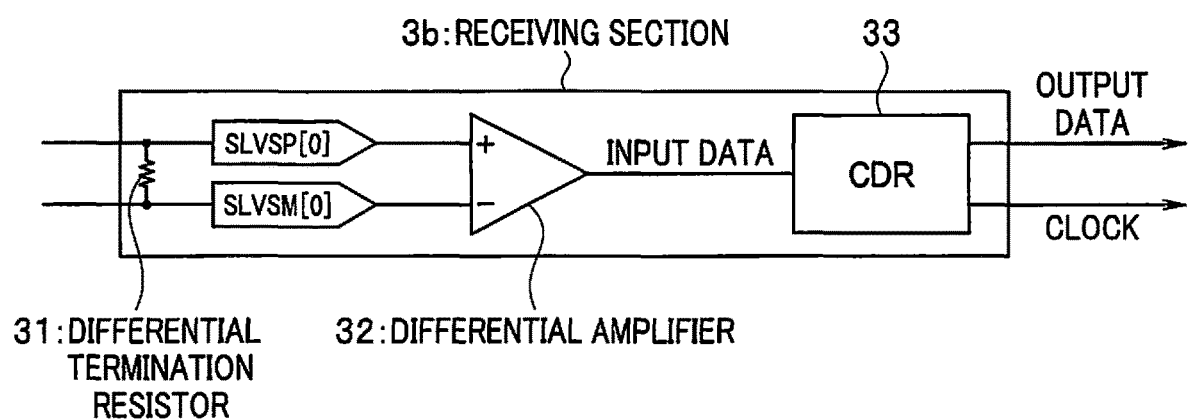
FIG. 4 is a diagram illustrating a configuration of a receiving section according to the Embodiment 1.

Next, FIG. 4 is a diagram illustrating a configuration of the receiving section 3*b*.

First, the receiving section 3*b* in the configuration shown in FIG. 4 is provided for each lane, and what is shown in FIG. 4 is the receiving section 3*b* corresponding to, for example, lane 0. Therefore, the receiving section 3*b* in a similar configuration is also provided for each of lanes 1 to 7.

The receiving section 3*b* is provided with a differential termination resistor 31, a differential amplifier 32 configured to differentially amplify an 8b10b scheme differential signal and a CDR (clock data recovery section) 33 configured to recover clock timing information embedded in the 8b10b scheme serial data.

A signal transmitted through each lane is terminated by the differential termination resistor 31 and inputted to the differential amplifier 32. Here, in the case of lane 0, a signal SLVSP[0] is inputted to a + terminal of the differential amplifier 32 and a signal SLVSM[0] is inputted to a − terminal of the differential amplifier 32, respectively.

Here, [0] appended to each signal SLVSP[0] or SLVSM[0] means that it is a signal of lane 0, "P" immediately preceding [0] means that it is a signal on the plus side (a signal to be inputted to the + terminal), "M" immediately preceding [0] means that it is a signal on the minus side (a signal to be inputted to the − terminal).

The differential amplifier 32 subtracts the signal SLVSM[0] inputted to the − terminal from the signal SLVSP[0] inputted to the + terminal and thereby outputs a signal, common noise of which is removed and an amplitude voltage of which is amplified.

Figure 5:
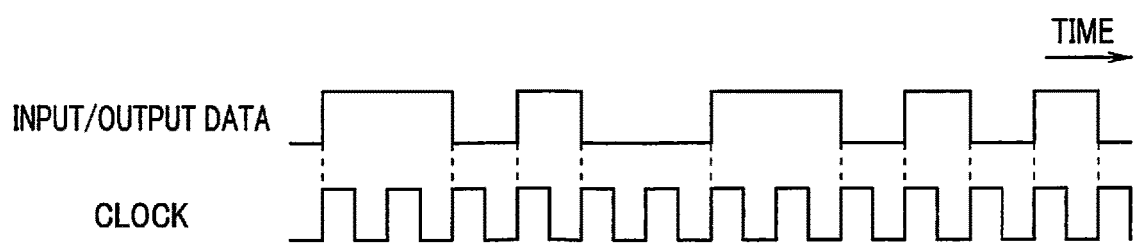
FIG. 5 is a timing chart illustrating input data/output data in a CDR and a recovered clock according to the Embodiment 1.

The signal outputted from the differential amplifier 32 becomes input data to the CDR 33. As described above, the CDR 33 is a clock data recovery section configured to recover clock timing information from the data inputted from the differential amplifier 32. In this way, output data and recovered clock timing information (clock) are outputted respectively from the CDR 33 as shown in FIG. 5. Here, FIG. 5 is a timing chart illustrating the input data/output data in the CDR 33 and the recovered clock.

In such a configuration, the power from the power supply section 3*c* shown in FIG. 2 is supplied to the differential amplifier 32 and the CDR 33 of the receiving section 3*b* such that on/off of the power can be controlled. That is, when turning on/off the power supply to the receiving section 3*b* from the power supply section 3*c*, the data processing section 3*a* is configured to turn on/off the power supply to the differential amplifier 32 and the CDR 33 based on a command from the camera control section 12. Here, the camera control section 12 may give an instruction for turning on/off the power supply to the image processing section 3 (data processing section 3*a*) or input an effective communication period command signal outputted from the image pickup section 2 via the exposure control section 9 and give an instruction for turning on/off the power supply to the image processing section 3 (data processing section 3*a*).

Figure 6:
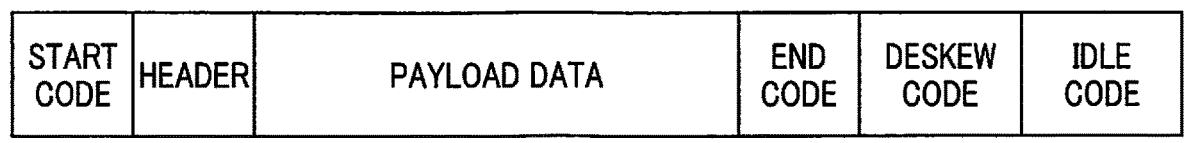
FIG. 6 is a diagram illustrating a configuration example of a one-line packet which is serial data corresponding to one line according to the Embodiment 1.

Next, FIG. 6 is a diagram illustrating a configuration example of a one-line packet which is serial data corresponding to one line.

The data output section 2*b* of the image pickup section 2 is configured to form a one-line packet as shown in FIG. 6 according to the SLVS-EC, sequentially output one-line packets in synchronization with a horizontal synchronization signal and thereby output video information corresponding to one frame.

The one-line packet includes a start code, a header, payload data, end code, a deskew code, and an idle code in this order. Note that a footer may also be included between the payload data and the end code as an option. Note that a portion of the one-line packet from the start code to the end code will be referred to as a "packet" hereinafter.

The start code is a code added to the head in the packet, indicating the start position of the packet (code indicating the head of the line of the video information).

The header includes information concerning a head line or an end line of one frame or not, information as to whether or not the payload data includes effective pixel data, information indicating a line number and an error detection code.

The payload data is basically a portion carrying video information. The payload data includes video information generated by the image pickup device 2*a* for an effective communication period (period during which serial data is effective) (therefore, the serial data outputted from the data output section 2*b* includes video information generated by the image pickup device 2*a*), and dummy data is embedded for an ineffective communication period (period during which the serial data is ineffective).

The end code is a code after the payload data, added at an end in the packet, indicating an end position of the packet (code indicating an end of the video information line).

The deskew code is appended to behind the end code and used by the image processing section 3 to secure synchronization of data of the packet transmitted via a plurality of lanes.

The idle code is a group of symbols repeatedly transmitted for a period other than transmission time of the packet data and the deskew code.

Therefore, the data-associated packet corresponds to a portion from the start code to the end code, and a portion including the data associated packet, the deskew code and the idle code (that is, a portion from the start code to immediately before the next start code) will be referred to as a one-line packet as described above.

In the SLVS-EC, the data output section 2b is configured to perform processing for carrying out handshake of communication start called a "training sequence" in starting communication.

The period of the training sequence is divided into three portions: an initial period, a synchronization code period and a deskew period in time sequential order.

First, the initial period is a period during which although power is supplied to the data output section 2b and the receiving section 3b, communication is not established yet, and a signal called "differential low" is outputted from the data output section 2b.

On the other hand, the synchronization code period is a period to determine from which bit to which bit of a plurality of serially transmitted bits correspond to a boundary of the 10-bit data (perform 10-bit alignment). The 10-bit alignment is performed by detecting a comma symbol (K character (K28.5)) which is a special 10-bit symbol to identify the 10-bit boundary.

However, in the SLVS-EC, 10 raised to the power of −10 is assumed as a bit error rate indicating a probability that a bit error occurs. Thus, in the training sequence, the same position is detected two or more times consecutively, and 10-bit alignment (10-bit boundary determination) is thereby confirmed. Therefore, for the synchronization code period, a synchronization code which is a code composed of four symbols including a comma symbol is outputted a plurality of times repeatedly.

Furthermore, the deskew period is a period during which a deskew amount which is a timing shift amount (a shift amount of reception timing of data received by the receiving section 3b) among a plurality of lanes is detected and corrected.

A timing shift among a plurality of lanes is caused by mismatch of operation timing of the circuit on the transmitting side, mismatch of the length of the transmission line, mismatch of operation timing of the circuit on the receiving side or the like. Thus, the deskew amount is determined according to the aforementioned deskew code.

However, to detect the deskew amount, the transmission time interval of the deskew code needs to be greater than double a maximum value of the deskew amount (maximum value that can be generated as the deskew amount) (otherwise, it is not possible to discriminate which of the two deskew codes at close timings on the other lanes although a deskew code on a certain lane should match in timing).

Therefore, for a deskew period, by sandwiching an appropriate number of the aforementioned idle codes between a certain deskew code and the next deskew code, a deskew code is repeatedly transmitted while maintaining a transmission time interval (predetermined interval) greater than double the maximum value of the deskew amount.

However, a case may also be assumed here where it is not possible to discriminate a deskew code due to the aforementioned bit errors. Therefore, when it is not possible to detect a deskew code for a period longer than the aforementioned predetermined interval, a deskew amount detection process is executed again from the beginning.

Thus, according to the 8b10b scheme, 10-bit alignment (symbol synchronization) is performed in which serial data separation positions are detected based on comma symbols. Thus, comma symbols defined under the 8b10b scheme are included in the predetermined code included in the serial data outputted from the data output section 2b.

To be more specific, the comma symbols are included standardly in the start code, the end code and the deskew code in the respective codes included in the one-line packet shown in FIG. 6. Therefore, all the start code, the end code and the deskew code can also be used for 10-bit alignment.

Furthermore, the idle code shown in FIG. 6 includes an arbitrary number of symbols and the idle code may also be configured to include comma symbols. Therefore, the idle code in which a comma symbol is embedded can also be used for 10-bit alignment.

The deskew code can also be used to detect a deskew amount which is a timing shift amount among the plurality of lanes (to detect for correction). However, not only the deskew code but also both the start code and the end code can be likewise used to detect a deskew amount.

In this way, to start a receiving operation of the receiving section 3b in a stopped state, it is necessary to detect a separation position of serial data (10-bit alignment) and a deskew amount which is a timing shift amount among the plurality of lanes as starting information, and the receiving operation of the receiving section 3b is established and started based on the detected starting information.

Therefore, the predetermined code associated with the separation position of the serial data included in the starting information includes at least one of the start code, the end code, the deskew code and the idle code in which the comma symbol is embedded.

The predetermined code associated with the deskew amount included in the starting information includes at least one of the start code, the end code and the deskew code.

Figure 7:
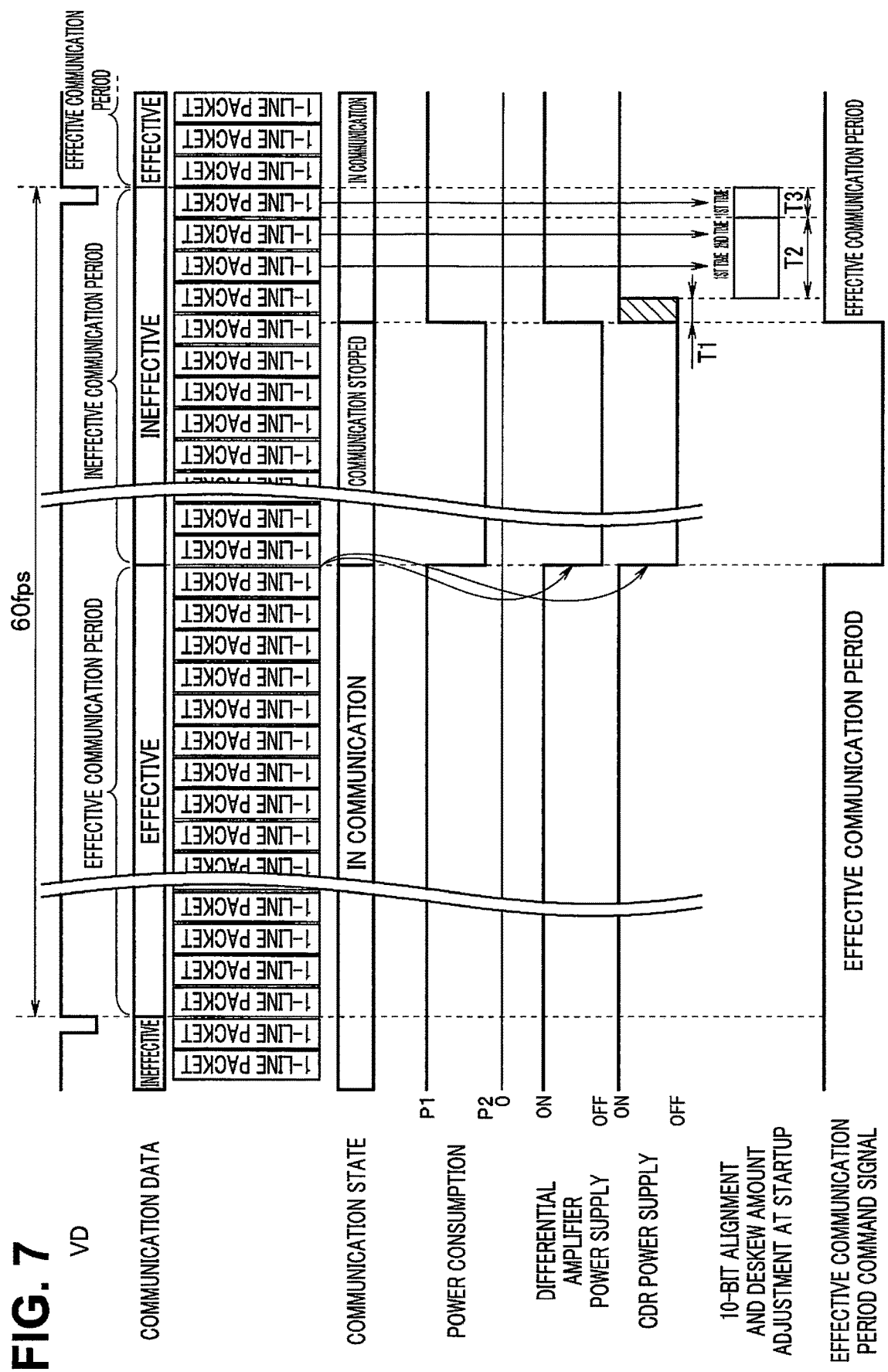
FIG. 7 is a timing chart describing a power supply state of a receiving section and a communication recovery procedure for an effective communication period and an ineffective communication period in the image pickup apparatus according to the Embodiment 1.

Next, FIG. 7 is a timing chart describing a power supply state and a communication recovery procedure of the receiving section 3b between an effective communication period and an ineffective communication period in the image pickup apparatus.

As described above, when the image pickup section 2 is enabled to stop data output corresponding to a high-speed operation, both the image pickup section 2 on the transmitting side and the image processing section 3 on the receiving side may stop the data output according to a stop sequence of a communication protocol. A high power consumption reduction effect can be achieved by turning off the power supply to the main parts in the image pickup section 2 such as the column parallel-type A/D converter, turning off the power supply to the data output section 2b and by the image processing section 3 which is the receiving side turning off the power supply to the receiving section 3b (power consumption of the data processing apparatus at the time is assumed to be P3 for a later comparison).

On the other hand, when the image pickup section 2 is not enabled to stop data output corresponding to a high-speed operation, all the main parts in the image pickup section 2 such as the column parallel-type A/D converter, the data output section 2b and the receiving section 3b remain operating or only the power supply to the main parts in the image pickup section 2 such as the column parallel-type A/D converter is turned off at most (power consumption of the data processing apparatus at the time is assumed to be P4 for a later comparison).

In contrast, according to the present embodiment, even when the image pickup section 2 is not enabled to stop data output corresponding to a high-speed operation, the data output section 2b remains operating, whereas it is possible to turn off the power supply to the main parts in the image pickup section 2 such as the column parallel-type A/D converter and the receiving section 3b and at the same time recover communication at necessary timing.

First, the example shown in FIG. 7 is an example in which an image is acquired and communicated in frame units of 60 (fps) in synchronization with a vertical synchronization signal VD.

As described above, the serial data is outputted in one-line packet units in synchronization with the horizontal synchronization signal. A period during which a one-line packet containing effective video information (here the effective video information includes OB (optical black) information and embedded data or the like in which image-related information is embedded) lasts is the effective communication period and a period during which dummy data or the like is embedded and a one-line packet containing no effective video information lasts is the ineffective communication period.

A specific example of the ineffective communication period, that is, a period during which the serial data outputted from the data output section 2b is ineffective is a vertical blanking period of the image pickup device 2a. However, the ineffective communication period is not limited to the vertical blanking period but may be other periods during which serial data is ineffective.

In the image pickup apparatus, if a drive mode for driving the image pickup section 2 is defined, the start timing of an ineffective communication period for a one-frame period (1 vertical synchronization period) (end timing of the immediately preceding effective communication period) and end timing of the ineffective communication period (start timing of the immediately following effective communication period) are known.

Therefore, if the drive mode is set, the number (predetermined number) of one-line packets read during the effective communication period is known. Therefore, by detecting the predetermined number of horizontal synchronization signals after detecting a vertical synchronization signal VD (or by counting a time period corresponding to a predetermined number of horizontal synchronization periods (line periods)) using a timer), it is possible to know timing at which the effective communication period ends and the ineffective communication period starts. However, as shown in FIG. 7, the exposure control section 9 may also be configured to recognize timing of the effective communication period or the ineffective communication period by outputting a timing signal indicating the effective communication period or the ineffective communication period (effective communication period command signal) from the image pickup device 2a (image pickup section 2) and notifying the camera control side (exposure control section 9).

Thus, the data processing section 3a causes the receiving section 3b to stop the receiving operation by turning off the power supply to the receiving section 3b (more specifically, the differential amplifier 32 and the CDR 33) from the power supply section 3c while maintaining the state in which the data output section 2b outputs the serial data at timing at which the ineffective communication period starts (however, a certain timing allowance may be included) based on the control of the camera control section 12.

With this operation the communication state of on-state during the effective communication period shifts to a communication stopped state.

By controlling the exposure control section 9 at timing at which the ineffective communication period starts, the camera control section 12 turns off the power supply to the main parts in the image pickup section 2 such as the column parallel-type A/D converter. This makes it possible to drastically reduce the power consumption P2 of the data processing apparatus in the communication stopped state compared to the power consumption P1 in the communicating state.

The power consumption P2 in the communication stopped state in the present embodiment is higher than the aforementioned power consumption P3, but it is lower than the power consumption P4.

On the other hand, the timing at which the ineffective communication period ends and the effective communication period starts is likewise known in advance. Thus, a process for recovering communication is started at timing traced back by a predetermined period from the start of the effective communication period. The predetermined period is a period set to reliably recover communication during the effective communication period even if the process for recovering communication fails several times. In the example shown in FIG. 7, the predetermined period is a period of (T1+T2+T3).

That is, at timing traced back by (T1+T2+T3) from the start of the effective communication period, the power supply to the receiving section 3b (the differential amplifier 32 and the CDR 33) from the power supply section 3c is turned on. However, the method of recognizing the timing of turning on the power supply to the receiving section 3b may also be adopted based on the effective communication period command signal (see FIG. 7) outputted from the image pickup device 2a (image pickup section 2) as described above, instead of the method based on the known timing.

In this way, the differential amplifier 32 starts operation, but the CDR 33 requires a certain period until the CDR 33 is enabled to recover the clock from the inputted SLVS-EC data (8b10b data). It is a CDR locking period T1 shown in FIG. 7 secured as a period until recovery of the clock is secured. In this way, the CDR 33 reliably recovers and outputs the clock when the CDR locking period T1 passes.

In this way, when the output data and clock are outputted from the receiving section 3b, 10-bit alignment is performed using any one or more of the aforementioned start code, end code, deskew code, and idle code in which a comma symbol is embedded and symbol synchronization is achieved for a 10-bit alignment establishment period T2.

However, as in the case of the aforementioned training sequence, 10-bit alignment (10-bit boundary) is confirmed through consecutive detections a plural number of times in consideration of influences of bit errors. In the example shown in FIG. 7, when it is detected that alignment positions match two times consecutively, the alignment positions are locked.

Therefore, when, for example, 10-bit alignment is established using a comma symbol included in the start code, two or more horizontal synchronization periods are necessary as the 10-bit alignment establishment period T2. However, when 10-bit alignment is established using comma symbols included in two or more of the start code, the end code, the deskew code and the idle code in which a comma symbol is embedded, the 10-bit alignment establishment period T2 is not limited to the case requiring two or more horizontal synchronization periods, but a case where the processing can be completed, for example, for one horizontal synchronization period may also exist.

As described above, when 10-bit alignment is established, a process of detecting and correcting a deskew amount is performed for a deskew amount adjustment period T3, using any one or more of the aforementioned start code, end code and deskew code. To be more specific, for example, the deskew codes on all lanes (or may also be the start codes or the end codes) are detected, a timing shift amount (deskew amount) among lanes is detected and a correction to cause timings on all the lanes to match is performed based on the detected deskew amount. Examples of the specific correction method include giving a delay to signals on other lanes in accordance with the signal on the lane having the largest delay.

Note that in order to detect a deskew amount, for example, a transmission time interval of the deskew code (or may also be the start code or the end code) needs to be greater than double a maximum value (maximum value of the deskew amount that can be generated as a deskew amount) of the deskew amount as described above. In order for the one horizontal synchronization period to satisfy the condition that it should be greater than double the maximum value of the deskew amount, the deskew code (or may also be the start code or the end code) included in each line packet is a code transmitted repeatedly at the transmission time interval that satisfies the condition.

The predetermined code included in the serial data is transmitted repeatedly a certain necessary number of times or more at a transmission time interval greater than double the maximum value of the deskew amount in order for the data processing section 3a to determine starting information after turning on the power supply (conversely, the 10-bit alignment establishment period T2 and the deskew amount adjustment period T3 are defined so that the predetermined code is transmitted repeatedly a certain necessary number of times or more).

Note that although an example has been described above where the data output section 2b outputs serial data through a plurality of lanes, the present invention is also applicable to a case where serial data is outputted through one lane. In the case, the process of detecting and correcting the deskew amount may be omitted.

Although an example has been described above where the data processing apparatus is applied to an image pickup apparatus, the present invention is not limited to the configuration, but the data processing apparatus may be applied to any appropriate apparatus that communicates serial data which is video information converted to data based on a predetermined format repeatedly through one or more lanes.

According to such Embodiment 1, the power supply to the receiving section 3b is turned off to stop the receiving operation for a period during which serial data is ineffective, the power supply to the receiving section 3b is turned on prior to the start of the period during which the serial data is effective, starting information is detected based on a predetermined code, a receiving operation is established and started, and so it is possible to reduce power consumption for the period during which the serial data is ineffective even when the data output section 2b cannot stop data output corresponding to a high-speed operation. Furthermore, when on/off of the power supply to the receiving section 3b is controlled based on an effective communication period command signal as shown in FIG. 7, power consumption can be reduced at timing in accordance with the actual operation state of the image pickup device 2a.

At this time, a further reduction of power consumption can be achieved for a period during which the serial data is ineffective not only by turning off the power supply to the receiving section 3b but by further turning off the power supply to the main parts in the image pickup section 2 such as the column parallel-type A/D converter.

By reducing power consumption in the way, it is possible not only to increase the allowable number of photographed images (or movie recording time) but also to inhibit the amount of heat generated in the image pickup apparatus. Especially in movie photographing, since the amount of heat generated in the image pickup apparatus is large, this can effectively contribute to prolongation of the movie recording time.

Furthermore, since the starting information includes separation positions of serial data and a deskew amount which is a timing shift amount among a plurality of lanes, it is possible to confirm, for example, 10-bit alignment necessary for serial data communication and detect and correct the deskew amount necessary for communication through a plurality of lanes.

Furthermore, since comma symbols defined under an 8b10b scheme are included in the predetermined code, it is possible to confirm 10-bit alignment through processing similar to the training sequence.

Since the predetermined code is transmitted at a transmission time interval greater than double the maximum value of the deskew amount, it is possible to reliably detect the deskew amount irrespective of the magnitude of the actual deskew amount.

In addition, since the predetermined code is transmitted repeatedly a certain necessary number of times or more, even when a detection fails due to a bit error or the like, the deskew amount can be reliably detected through a retry.

Furthermore, since the predetermined code associated with the separation positions of the serial data includes at least one of the start code, the end code, the deskew code and the idle code in which the comma symbol is embedded, it is possible to detect 10-bit alignment using any one code at least once for one horizontal synchronization period. Especially when a plurality of kinds of codes are used, it is possible to confirm 10-bit alignment in a shorter time period.

Furthermore, since the predetermined code associated with the deskew amount includes at least one of the start code, the end code and the deskew code, using any one of the codes, it is possible to automatically satisfy the conditions for transmitting the predetermined code at a transmission time interval greater than double a maximum value of the deskew amount. It is possible to confirm the deskew amount in a shorter time period by detecting both the deskew amounts on all lanes using a certain kind of code for a one-line packet and the deskew amounts on all lanes using other kinds of codes for the one-line packet.

In addition, when the power supply to the receiving section 3b is turned off, the power supply to the differential amplifier 32 and the CDR 33 are turned off, and so it is possible to reliably stop operations of the differential amplifier 32 and the CDR 33 having relatively large power consumption in the receiving section 3b, and effectively reduce power consumption.

When the data processing apparatus includes the image pickup device 2a and the serial data includes video information generated by the image pickup device 2a, an image pickup apparatus or the like to which the data processing apparatus is applied can reduce power consumption as described above.

Furthermore, the period during which the serial data is ineffective is assumed to be a vertical blanking period of the image pickup device 2a, since the vertical blanking period accounts for a relatively large time proportion of the one-frame period, it is possible to efficiently reduce power consumption.

Especially, in accordance with the speed enhancement of image pickup devices in recent years, an effective communication period in a frame period is becoming shorter. For the reason, the technique of the present embodiment intending to reduce power consumption on the receiving side during an ineffective communication period constitutes a highly useful technique that effectively contributes to a reduction of power consumption of the entire data processing apparatus.

Note that the processing of each component described above may be performed by a processor configured as hardware.

The data processing apparatus has been mainly described so far, but the present invention may be an image processing apparatus or an image pickup apparatus to which the data processing apparatus is applied. The present invention may also be a method for controlling a data processing apparatus that controls a data processing apparatus as described above or a program for causing a computer to execute control of a data processing apparatus and perform processing similar to the processing of the data processing apparatus or a computer-readable, non-transitory recording medium that records the program.

Having described the preferred embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

What is claimed is:

1. A data processing apparatus comprising:
   a data output section configured to repeatedly output serial data which is video information converted to data based on a predetermined format through one or more lanes; and
   a data processing section comprising a receiving section configured to receive the serial data outputted from the data output section and a power supply section configured to supply power to the receiving section, and the data processing section configured to process the serial data received by the receiving section, wherein
   the data processing section stops receiving operation of the receiving section by turning off power supply to the receiving section from the power supply section for a period during which the serial data outputted from the data output section is ineffective while maintaining a state in which the data output section outputs the serial data, and
   turns on the power supply to the receiving section from the power supply section prior to the start of a period during which the serial data outputted from the data output section is effective, wherein the data processing section detects, after turning on the power supply to the receiving section, starting information necessary to start the receiving operation of the receiving section based on a predetermined code included in the serial data outputted from the data output section, and establishes and starts the receiving operation of the receiving section based on the detected starting information;
   wherein the data output section repeatedly outputs the serial data through a plurality of lanes, and the starting information includes separation positions of the serial data and a deskew amount which is a timing shift amount among the plurality of lanes;
   wherein the predetermined code is transmitted repeatedly a necessary number of times or more at a transmission time interval greater than double a maximum value of the deskew amount in order for the data processing section to determine the starting information after turning on the power supply of the receiving section.

2. The data processing apparatus according to claim 1, wherein the predetermined format includes an 8b10b scheme and the predetermined code included in the serial data outputted from the data output section includes a comma symbol defined under the 8b10b scheme.

3. The data processing apparatus according to claim 2, wherein the predetermined code associated with the separation positions of the serial data included in the starting information includes at least one of a start code indicating a head of a line of the video information, an end code indicating an end of the line of the video information, a deskew code appended to behind the end code and an idle code in which the comma symbol is embedded.

4. The data processing apparatus according to claim 2, wherein the predetermined code associated with the deskew amount included in the starting information includes at least one of a start code indicating a head of a line of the video information, an end code indicating an end of the line of the video information and a deskew code appended to behind the end code.

5. The data processing apparatus according to claim 2, wherein the receiving section comprises a differential amplifier configured to differentially amplify an 8b10b scheme differential signal and a CDR which is a clock data recovering section configured to recover clock timing information embedded in the 8b10b scheme serial data, and
   the data processing section turns off power supply to the differential amplifier and the CDR when turning off power supply to the receiving section from the power supply section.

6. The data processing apparatus according to claim 1, further comprising an image pickup device configured to generate the video information, wherein
   the serial data outputted from the data output section includes the video information generated by the image pickup device.

7. The data processing apparatus according to claim 6, wherein the period during which the serial data outputted from the data output section is ineffective is a vertical blanking period of the image pickup device.

8. A method for controlling a data processing apparatus comprising a data output section and a data processing section provided with a receiving section and a power supply section, the method for controlling the data processing apparatus comprising:
   a data output step of causing the data output section to repeatedly output serial data which is video information converted to data based on a predetermined format through one or more lanes;
   a receiving step of causing the receiving section to receive the serial data outputted from the data output section;
   a power supplying step of causing the power supply section to supply power to the receiving section; and a data processing step of causing the data processing section to process the serial data received by the receiving section, wherein the data processing step comprises:

a first step of stopping receiving operation of the receiving section by turning off power supply to the receiving section from the power supply section for a period during which the serial data outputted from the data output section is ineffective while maintaining a state in which the data output section outputs the serial data; and a second step of turning on the power supply to the receiving section from the power supply section prior to the start of a period during which the serial data outputted from the data output section is effective, detecting, after turning on the power supply to the receiving section, starting information necessary to start the receiving operation of the receiving section based on a predetermined code included in the serial data outputted from the data output section, and establishing and starting the receiving operation of the receiving section based on the detected starting information;

wherein the data output step is a step of causing the data output section to repeatedly output the serial data through a plurality of lanes, and the second step is a step of detecting the starting information including separation positions of the serial data and a deskew amount which is a timing shift amount among the plurality of lanes;

wherein the data output step is a step of causing the data output section to repeatedly transmit the predetermined code a necessary number of times or more at a transmission time interval greater than double a maximum value of the deskew amount in order for the data processing section to determine the starting information after turning on the power supply of the receiving section.

9. The method for controlling a data processing apparatus according to claim 8, wherein the data output step is a step of causing the data output section to repeatedly output the serial data which is the video information converted to data based on the predetermined format including an 8b10b scheme through the plurality of lanes, the second step is a step of detecting the starting information based on the predetermined code including a comma symbol defined under the 8b10b scheme.

10. The method for controlling a data processing apparatus according to claim 9, wherein the second step is a step of detecting separation positions of the serial data included in the starting information based on at least one of a start code indicating the head of a line of the video information, an end code indicating an end of the line of a video information, a deskew code appended to behind the end code and an idle code in which the comma symbol is embedded.

11. The method for controlling a data processing apparatus according to claim 9, wherein the second step is a step of detecting the deskew amount included in the starting information based on the predetermined code including at least one of a start code indicating a head of a line of the video information, an end code indicating an end of the line of the video information and a deskew code appended to behind the end code.

12. The method for controlling a data processing apparatus according to claim 9, wherein the receiving step is a step of causing a differential amplifier of the receiving section comprising the differential amplifier and a CDR which is a clock data recovering section to differentially amplify the 8b10b scheme differential signal and causing the CDR to recover clock timing information embedded in the 8b10b scheme serial data, and the first step is a step of turning off the power supply to the differential amplifier and the CDR when turning off the power supply to the receiving section from the power supply section.

13. A computer-readable, non-transitory recording medium configured to record a program for causing a computer to perform control of a data processing apparatus comprising a data output section and a data processing section provided with a receiving section and a power supply section, the program comprising:

a data outputting step of causing the data output section to repeatedly output serial data which is video information converted to data based on a predetermined format through one or more lanes;

a receiving step of causing the receiving section to receive the serial data outputted from the data output section;

a power supplying step of causing the power supply section to supply power to the receiving section; and a data processing step of causing the data processing section to process the serial data received by the receiving section, wherein the data processing step comprises:

a first step of stopping receiving operation of the receiving section by turning off power supply to the receiving section from the power supply section for a period during which the serial data outputted from the data output section is ineffective while maintaining a state in which the data output section outputs the serial data; and a second step of turning on the power supply to the receiving section from the power supply section prior to the start of a period during which the serial data outputted from the data output section is effective, detecting, after turning on the power supply to the receiving section, starting information necessary to start the receiving operation of the receiving section based on a predetermined code included in the serial data outputted from the data output section, and establishing and starting the receiving operation of the receiving section based on the detected starting information;

wherein the data outputting step is a step of causing the data output section to repeatedly output the serial data through a plurality of lanes, and the second step is a step of detecting the starting information including separation positions of the serial data and a deskew amount which is a timing shift amount among the plurality of lanes;

wherein the data outputting step is a step of causing the data output section to repeatedly transmit the predetermined code a necessary number of times or more at a transmission time interval greater than double a maximum value of the deskew amount in order for the data processing section to determine the starting information after turning on the power supply of the receiving section.

14. The recording medium according to claim 13, wherein the data outputting step is a step of causing the data output section to repeatedly output the serial data which the starting information converted to data based on the predetermined format including an 8b10b scheme through the plurality of lanes, the second step is a step of detecting the starting information based on the predetermined code including a comma symbol defined under the 8b10b scheme.

15. The recording medium according to claim 14, wherein the second step is a step of detecting separation positions of the serial data included in the starting information based on the predetermined code including at least one of a start code indicating a head of a line of the video information, an end code indicating an end of the line of the video information, a deskew code appended to behind the end code and an idle code in which the comma symbol is embedded.

16. The recording medium according to claim 14, wherein the second step is a step of detecting the deskew amount included in the starting information based on the predetermined code including at least one of a start code indicating a head of a line of the video information, an end code indicating an end of the line of the video information and a deskew code appended to behind the end code.

17. The recording medium according to claim 14, wherein the receiving step is a step of causing a differential amplifier of the receiving section comprising the differential amplifier and a CDR which is a clock data recovering section to differentially amplify the 8b10b scheme differential signal and causing the CDR to recover clock timing information embedded in the 8b10b scheme serial data, and the first step is a step of turning off the power supply to the differential amplifier and the CDR when turning off the power supply to the receiving section from the power supply section.

* * * * *